US006117315A

United States Patent [19]

Masson

[11] Patent Number: 6,117,315

[45] Date of Patent: Sep. 12, 2000

[54] PROCESS AND DEVICE FOR RECYCLING WASHING WATER IN PHOTOGRAPHIC PROCESSING

[75] Inventor: Jean-Pierre R. Masson, Farges les Chalon, France

[73] Assignee: Eastman Kodak Company, Rochester, N.Y.

[21] Appl. No.: 09/386,684

[22] Filed: Aug. 31, 1999

Related U.S. Application Data

[62] Division of application No. 09/235,428, Jan. 22, 1999, Pat. No. 6,010,833.

[30] Foreign Application Priority Data

| | | | |
|---|---|---|---|
| Jan. 22, 1998 | [FR] | France | 98 00870 |
| Nov. 25, 1998 | [FR] | France | 98 15010 |

[51] Int. Cl.[7] ........ B01D 63/00; B01D 61/58; G03C 5/395

[52] U.S. Cl. ........ 210/195.2; 210/196; 210/321.65; 430/398; 430/399; 430/400

[58] Field of Search ........ 210/167, 321.65, 210/196, 195.2; 430/398, 399, 400

[56] References Cited

U.S. PATENT DOCUMENTS

| | | |
|---|---|---|
| 3,970,457 | 7/1976 | Parsonage . |
| 5,242,597 | 9/1993 | McArdle . |
| 5,360,782 | 11/1994 | Young et al. . |
| 5,439,584 | 8/1995 | Rosenfield . |
| 5,607,592 | 3/1997 | Bernard et al. . |
| 5,679,503 | 10/1997 | Martin et al. . |
| 5,958,245 | 9/1999 | Martin et al. . |
| 5,989,433 | 11/1999 | Martin et al. . |
| 5,998,108 | 12/1999 | Martin . |
| 6,010,833 | 1/2000 | Masson . |

FOREIGN PATENT DOCUMENTS

| | | |
|---|---|---|
| 0497199 | 1/1992 | European Pat. Off. . |
| 8503064 | 7/1985 | WIPO . |

OTHER PUBLICATIONS

MLSchreiber "Present Status of Silver Recovery in Motion Picture Laboratoris" JR of the SMPTE, vol. 74, Jun. 1965, pp. 505–513.

*Primary Examiner*—Thomas M. Lithgow
*Attorney, Agent, or Firm*—J. Lanny Tucker

[57] ABSTRACT

The invention relates to a process and apparatus for the treatment of photographic films. The film circulates in a series of processing baths, each of these baths comprising a washing area each comprising one or more tanks, the waste water from all the washing areas is recovered and treated in a single nanofiltration device, common to all the processing baths, the water hardness of the permeate from the nanofiltration device is adjusted, and the permeate is recycled to each of the washing areas of each of the processing baths.

4 Claims, 2 Drawing Sheets

PROCESS AND DEVICE FOR RECYCLING WASHING WATER IN PHOTOGRAPHIC PROCESSING

CROSS-REFERENCE TO RELATED APPLICATION

Figure 1:
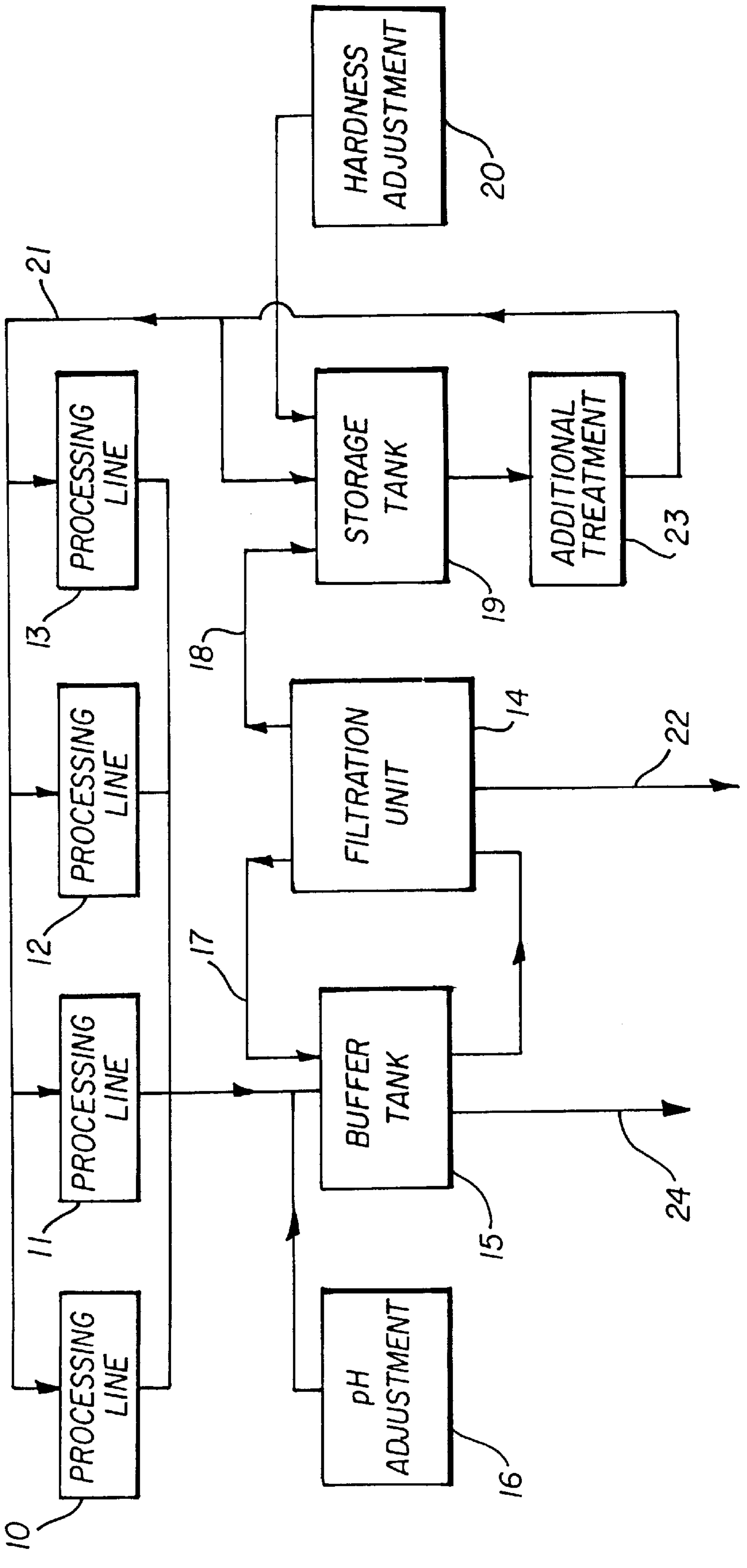

This is a Divisional of application Ser. No. 09/235,428 filed Jan. 22, 1999, now U.S. Pat. No. 6,010,833.

FIELD OF THE INVENTION

This invention relates to the processing of photographic films, and in particular to the recycling of washing water from such processing.

BACKGROUND OF THE INVENTION

Numerous manufacturing and processing methods generate waste water that cannot be disposed of via the sewers because of their composition, and that contain substances the recovery and re-use of which could be economically gainful. One example is the photographic processing industry, in which exposed films and photographic papers are treated in successive processing baths containing large numbers of chemicals. Such methods for processing photographic films are well known (see for example, Chimie et physique photographiques, Pierre Glafkides, Vol. 2, ch. XL, pages 947–967), and therefore require no further description. These processes produce washing water containing relatively low concentrations of chemicals that are costly to remove by current methods.

In a first established approach, the treatment of waste water from photographic baths takes place in two steps, one step to eliminate salts from the solution by ion exchange, and one step to eliminate organic chemicals by absorption e.g., using activated carbon. Using a subsequent process involving additional chemicals, the substances extracted from the solutions have then to be removed from the ion exchange resins and the activated carbon.

Evaporation and distillation are also used to separate dissolved substances. However, for very dilute solutions, these processes are costly because of the high energy consumption they entail.

In a second more recent approach, ultrafiltration, nanofiltration, and reverse osmosis have been used for waste water treatment. In this approach, each treatment bath in a processing plant is linked to its own ultrafiltration or nanofiltration unit. Such units use membranes, which behave in principle as large surface-area sieves, the "holes" of which are pores of microscopic or molecular dimensions, the size range of which must be very narrow so that molecules greater than a set size are retained while smaller molecules and simple salt ions are let through the membrane. The membranes for ultrafiltration generally let through molecules with molecular weights less than about 2,000, larger size molecules being retained. In nanofiltration, this molecular weight threshold is about 200. The molecular weight threshold for reverse osmosis is about 100 or less. In this description, the term "filtration" refers indiscriminately to ultrafiltration, nanofiltration or reverse osmosis, i.e., all systems of filtration by membrane technology.

Filtration membranes of this type can possess high selectivities, but they allow only low flow rates. In general, one filtration unit is used per treatment bath, i.e., one unit to treat the waste water from the developing bath, a second one for the fixing bath, a third one for the bleaching bath, and so on. The permeate from each of these filtration units is recycled exclusively to the washing bath that is associated with the bath the waste water came from. Such systems are abundantly described in the patent literature, in particular in Patents U.S. Pat. No. 4,451,132 and FR-A-2 684 024.

The main drawback of these arrangements is that the large number of separate ultrafiltration or nanofiltration units increases the cost, space requirements, and maintenance needs of the processing plant.

In addition, the substances that contaminate the washing water from photographic processing are very diverse; they include organic compounds such as developing agents, inorganic chemicals, in particular mineral salts, and chelates. All these substances have to be removed, so the membranes have to be chosen and used in such a way that all these substances are eliminated completely, or at least to a degree that meets the photographic processing standards in the case of recycling, or effluent standards. However, if the waste water is strongly demineralized, the resulting water is no longer able to fulfill its washing function when it is recycled in the photographic process, and yet if it is not thoroughly rid of contaminants it cannot be recycled indiscriminately at any step in the process.

SUMMARY OF THE INVENTION

Accordingly, it is an object of this invention to provide a process and apparatus for the treatment of a photographic film with which the recovery and treatment of washing water does not cause the problems referred to above, but nevertheless allows optimal use of filtration membranes.

Other objects will be stated in detail in the following description.

These objects are achieved according to this invention which provides a process for recycling waste water from photographic processing that comprises circulation of a photographic film in at least one processing bath associated with a washing area that includes one or more tanks, the process comprising, successively:

a) adjusting the pH of the waste water from at least one of the washing tanks to a value between 6 and 8;

b) treating all the waste water in a single filtration device;

c) adjusting the water hardness of the permeate from step b) to a value equal to or greater than 1 degree of hardness; and d) recycling the permeate from step c) in any one of the tanks in the washing area.

Provision can be made for a water supply from an auxiliary source to top up the baths.

In another aspect of this invention, there is provided an apparatus to recycle waste water from photographic processes that comprise a succession of various processing baths through which a film is led, each bath being associated with a washing area that comprises one or more washing tanks, the apparatus comprising:

a) means to mix the waste water from washing tanks;

b) means to adjust the pH of said waste water thereby mixed to a value between 6 and 8;

c) a nanofiltration device 14 common to all the processes (10, 11, 12, 13) designed to receive and treat the waste water from all the washing areas;

d) means to adjust the water hardness of the resulting permeate to a value equal to or greater than 15 degrees of hardness; and e) means to recycle the permeate from the filtration device (14) into at least one of the process washing areas (10, 11, 12, 13).

Alternatively, the retentate from the filtration device can be treated by electrolysis to recover the silver contained therein.

Embodiments

In general, a color photographic processing line comprises a photographic film feed system in which the film is kept out of light.

The film is then fed into a first processing area comprising a color developer bath and a development stop bath to stop the color development reaction. This processing area also includes a washing area comprising one or more washing tanks (typically two).

The film then moves through a bleaching bath comprising a first series of tanks containing a bleaching accelerator, a second series of tanks containing the bleaching agent, and a third series of tanks containing water to wash the film.

The film is then fed into a fixing bath comprising a first area where the film is brought into contact with the fixing agent and a washing area also consisting of one or more successive tanks through which the film moves.

The film can then be fed into a pre-bath (typically carbonate or sulfate), after which it goes into a system in which the carbon black backing can be removed, if necessary (e.g., movie film). In general, such a system uses the action of water jets, sometimes in conjunction with brush rollers.

Depending on the type of film to be developed (e.g. motion picture, film), the film can then be led to a station where a developer is applied to develop the sound track, and then to a further washing station, and finally to a fixing bath and a washing area.

In all the washing zones in the facility, the washing can be done either with the flow or counter-flow.

The configuration of the baths given above is only indicative. Depending on the type of film processed (color positive film, color negative film, black-and-white film, etc.), the configurations can differ.

After the actual processing the film is led to a drying station after going through a solution of surfactant and biocide designed, among other things, to prevent bacterial growth and, in general, to condition the film for the drying stage.

In the following description reference will be made to FIG. 1 of the drawing, which schematically represents a device designed to implement the process of the invention. This device is designed to collect the treatment water from several separate processing lines (here, four) 10, 11, 12, 13.

According to an important characteristic of this invention, the waste water contained in the washing areas of processing lines 10, 11, 12 and 13 is recovered and sent to a filtration unit 14 that is common to all the treatments 10, 11, 12 and 13. Typically, the water is brought to the filtration unit via a buffer tank 15, using appropriate pumps and valves that are not depicted. A tank 16 contains a basic or acidic solution to adjust the pH of the waste water in tank 15 to a value between 6 and 8, preferably between 6.5 and 7.5. This acidic or basic solution must not cause any unwanted side effects such as precipitation. If the pH of the initially collected waste water has to be lowered because it is too basic, acetic acid is generally used, diluted to about 20%. Aqueous solutions of sodium or potassium hydroxide are used if the pH of the initially collected waste water has to be raised because it is too acidic. A probe can be used to control the amount of acid or base to be added according to the pH sought.

In an embodiment depicted in FIG. 1, the retentate (or filtration residue) is sent (line 17) to the buffer tank 15. When the contents of the tank are sufficiently rich in silver, they can be treated by electrolysis to recover the silver, for example. A pipe 24 allows the retentate to be run off to another area for recycling or destruction.

The filtration unit 14 can comprise a single membrane, or several membrane modules in series, each module comprising one or more membranes in parallel, according to the separation levels and flow rates required. Membranes are used that are able to retain all the constituents present in the washing water from the processing baths, whether these were part of the initial composition of the baths, or derived from the films being treated. These constituents include ions such as halides (Cl, Br, I), sulfite, thiosulfate, thiocyanate, sulfate, carbonate, borate, nitrate, aluminium, iron, alkali metal (Li, Na, K) and alkaline earth, organic substances such as hydroquinones, 3-pyrazolidones, paraphenylenediamine, p-aminophenol, heterocyclic compounds such as heterocyclic thiols, aminoalcohols, polyalkenyleneglycols, etc., chelates such as polyaminocarboxylic acid complexes, e.g., Fe-EDTA complexes, etc. As an indication, good results were obtained with a Filmtec® NF 70 nanofiltration membrane, a Filmtec® BW 30 membrane, a Filmtec® SW 30 membrane, etc.

Another important characteristic of the invention consists in sending the permeate (line 18) produced by the filtration unit 14 to a storage tank 19 into which a saline solution from tank 20 can be run to add at least 5 mg of Ca per liter of permeate, allowing the hardness of the water to be adjusted to a value greater than 1 degree of hardness. According to an embodiment, it is added to the permeate at least 20 and preferably at lest 40 mg per liter of permeate, which corresponds to a hardness of 10. The solution in tank 20 can merely be a calcium salt solution, e.g., a solution of $CaCl_2$. According to a preferred embodiment, a salt solution is used which is a 50—50 by weight mixture of $MgCl_2$ and $CaCl_2$, at least providing an equivalent of 20 mg of Ca and 20 mg of Ng per liter of permeate. A probe, not depicted, can measure the conductivity of the permeate and so control the salt supply required. On leaving tank 19, the permeate can also pass through a unit 23 for additional treatment, e.g., a UV treatment or a treatment to eliminate bacteria. In the case of motion picture film, the hardness of the washing water must be greater than 15, but should preferably not exceed 20 or 25; otherwise this would cause deposits on the film, which would lead to defects visible on viewing.

Another important characteristic of the invention is that the permeate (line 21) after leaving the unit 19 is sent to any of the different process washing areas 10, 11, 12, and 13. The permeate recirculating circuit can include a valve, a buffer tank and a pump, not depicted. Inside each washing area, the water from unit 14 can be run optionally into any one of the washing tanks, any combination of the washing tanks, or all of the washing tanks. The quantity of water that may have to be added to top up the tanks will depend partly on the retention rate of the nanofiltration device. For example, in the case of a filtration process with a flow-through of 80% and a retention rate of 20%, 20% water is added. In the invention, the flow-through is at least 80%, preferably at least 85% and advantageously more than 90%, depending on the concentrations of contaminants in the water. Depending on the hardness of the water added, additions of calcium can optionally be made at different locations within the system.

In the embodiment described above, a single filtration unit is associated with several color processing lines. In the case of a processing laboratory with different developing lines for different film types (one line for black-and-white film, a second for color negative film, a third for color positive film, etc.), it is also possible to configure the system so as to associate a single nanofiltration unit with all of these processing lines.

Figure 2:
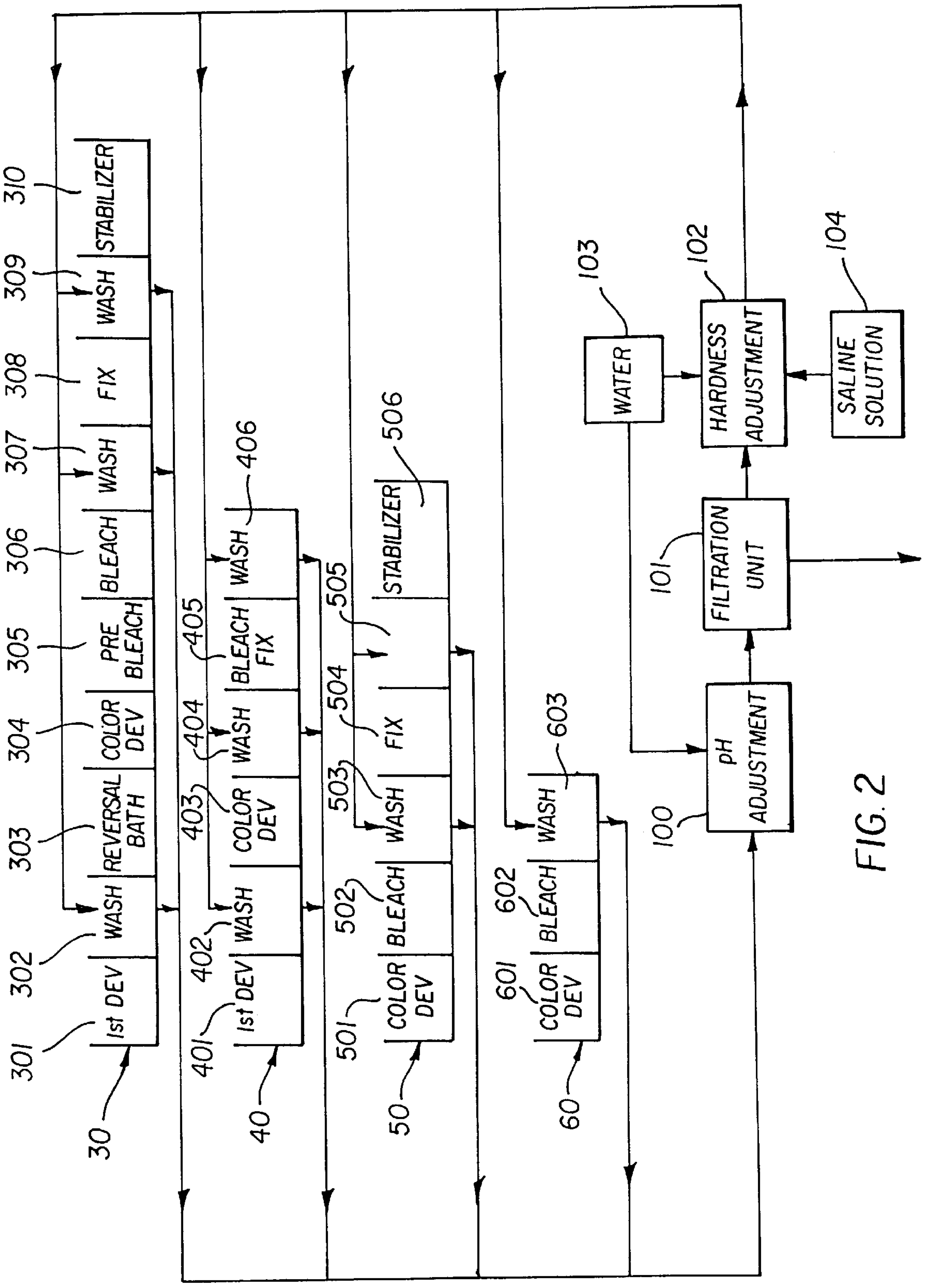

FIG. 2 is a schematic view of another installation for the implementation of the process of the invention applied to the Kodak E-6 process.

This installation comprises four processing lines (30), (40), (50), and (60). Line (30) is a reversal color process; it comprises:

a tank 301 containing a first developer (black-and-white);

a tank 302 for washing;

a tank 303 containing a reversal bath;

a tank 304 containing a color developer;

a tank 305 containing a pre-bleaching bath;

a tank 306 containing a bleaching bath;

a tank 307 for washing;

a tank 308 for fixing;

a tank 309 for washing;

a tank 310 containing a stabilizing bath.

Line (40) is another reversal color process such as the Kodak R-3 process. It comprises:

a tank 401, containing a first developer (black-and-white);

a tank 402, for washing;

a tank 403, for color development, a tank 404, for washing;

a tank 405, for bleach-fixing;

a tank 406, for washing.

Line (50) is a color negative process such as the Kodak C-41 process. It comprises:

a tank 501, for color development;

a tank 502, for bleaching;

a tank 503, for washing;

a tank 504, for fixing;

a tank 506, for stabilizing.

Line (60) is a color process such as the Kodak RA-4 process. It comprises:

a tank 601, for color development;

a tank 602 for bleach-fixing;

a tank 603 for washing.

The water from the washing tanks of these four lines are collected in tank 100 (where the pH can be adjusted as described above), and then sent to the filtration unit 101. After leaving unit 101, the permeate is sent to tank 102, where its hardness is adjusted as described above by means of a saline solution (calcium and magnesium) supplied from tank 104. A tank 103 allows water to be added to the permeate or the retentate (tank 100) depending on the hardness of the water used. The permeate is then recycled into one or more of the washing tanks of any of the four processing lines.

The concept common to all these variants of the invention is that the same nanofiltration unit can be associated with several processing lines, which may even be of different types, and that the permeate produced by said nanofiltration unit common to several processing lines can be recycled to any washing area in any of the processing lines, without adversely affecting the sensitometric quality of any of the films being processed. This result can be achieved because the concentrations of contaminants present in the washing water can be lowered to below the relevant thresholds. In particular, with the process of the invention, using a Filmtec® NF 70 membrane, the filtered washing water from an R-3 process can attain the following quality (concentrations in mg/l):

| | |
|---|---|
| Silver | <0.1 |
| Iron | 0.3 |
| Iodide | 0.1 |
| Magnesium | 0.2 |
| EDTA | 1.0 |
| Bromide | 1.5 |
| Chloride | 1.5 |
| Sulfate | 2.0 |
| Thiosulfate | 3.0 |
| Nitrate | 0 |
| Phosphate | 0 |
| Fluoride | 0 |
| Thiocyanate | 1.0 |
| Carbonate | 3.0 |

Another major advantage of all these approaches is the savings of washing water they afford.

The invention has been described in terms of preferred embodiments. Clearly, variants can be devised within the scope of the invention as defined in the following claims.

What is claimed is:

1. An apparatus to recycle waste water from photographic processes that comprise a succession of various processing baths through which a film is led, each bath being associated with a washing area that comprises one or more washing tanks, said apparatus comprising:

a) means to mix the waste water from washing tanks;

b) means to adjust the pH of said waste water thereby mixed to a value between 6 and 8;

c) a nanofiltration device 14 common to all the processes (10, 11, 12, 13) designed to receive and treat said waste water from all said washing areas;

d) means to adjust the water hardness of the resulting permeate to a value equal to or greater than 1 degree of hardness; and e) means to recycle said permeate from said filtration device (14) into at least one of the process washing areas (10, 11, 12, 13).

2. The apparatus of claim 1 further comprising means to supply any of the tanks in said installation with water.

3. The apparatus of claim 1 wherein said succession of various processing baths includes at least one developing bath, one fixing bath, and one bleaching bath, or one bleach-fixing bath.

4. The apparatus of claim 1 further comprising an electrolysis unit for the recovery of the silver present in the retentate.

* * * * *